Patented Mar. 3, 1953

2,630,372

UNITED STATES PATENT OFFICE 2,630,372

PROCESS FOR THE PRODUCTION OF STABILIZED SODIUM ACID PYROPHOSPHATE

Felix H. Wright, Jr., Dayton, Ohio, assignor to Monsanto Chemical Company, St. Louis, Mo., a corporation of Delaware No Drawing. Application June 17, 1952, Serial No. 294,042

4 Claims. (Cl. 23—106)

The present invention relates to a fast reacting sodium acid pyrophosphate and to a novel method of producing the same.

The principal object of the invention is to provide sodium acid pyrophosphate having a combination of properties which render it eminently suitable for use in the production of doughnuts.

Another object is to provide sodium acid pyrophosphate having a reaction rate of 32 to 40 and preferably 34 to 38 inclusive.

A further object is to provide sodium acid pyrophosphate having a reaction rate within the above range and having a controlled stability, such that the dough reaction rate of such sodium acid pyrophosphate does not increase more than 3% to 5% when the above product is subjected to 75% relative humidity and a temperature of 30° C. for a period of seven days.

A still further object is to provide a novel method of producing sodium acid pyrophosphate having the above desirable properties.

Other objects and advantages will become apparent to those skilled in the art as the description proceeds.

The preparation of uniform doughnuts of good color and texture with low grease soaking properties, regular flutes and plump, well-rounded walls requires sodium acid pyrophosphate with a special combination of properties. For example, if the above leavening acid has a reaction rate which is too slow, i. e., below 32, doughnuts prepared in a doughnut-making machine from doughnut mixes containing same are deformed and have a cracked surface which impairs their appearance. Moreover, the cracked surfaces of the doughnuts permit excessive grease absorption which has a deleterious effect on their palatability, as well as an added expense to the baker due to excessive use of expensive fat. On the other hand, if the reaction rate of the sodium acid pyrophosphate is too fast, i. e., above 40, the doughnuts made in the machine are deformed, flat and spongy in character and also demonstrate cracked surfaces with the result that they absorb excessive quantities of grease which substantially impairs their appearance and palatability and results in greater production costs.

While a fast reaction rate is an essential property of a satisfactory leavening acid for baking doughnuts, it is not the only factor which determines the utility of sodium acid pyrophosphate for the above purpose. For example, a sodium acid pyrophosphate may have a reaction rate within the range of 32 to 40 and still not yield satisfactory doughnuts; in order to perform this function satisfactorily and at the same time possess the desired degree of stability to change in reaction rate, it must contain the aluminum and alkali metal oxide impurities disclosed in Patent No. 2,408,258 to Eugene N. Hetzel et al. and be treated in the manner hereinafter described.

In accordance with the present invention a method of preparing sodium acid pyrophosphate has been developed whereby a stabilized, fast-reacting product is obtained which is eminently suitable for use in the baking of doughnuts.

The process of the present invention for the preparation of sodium acid pyrophosphate having substantially improved doughnut baking properties essentially comprises thermally evaporating a monosodium orthophosphate solution containing from 0.50% to 0.65% by weight of phosphoric acid, together with about 0.10% to about 0.20% $K_2O$ and about 0.025% to about 0.075% $Al_2O_3$, basis $NaH_2PO_4$, to produce substantially dry monosodium orthophosphate. This monosodium orthophosphate is then calcined at a temperature of about 225° C. to about 235° C. until sodium acid pyrophosphate has been formed. The next step is the tempering of the said pyrophosphate by maintaining it at atmospheric pressure and at a temperature of about 215° C. to about 245° C. in an atmosphere containing 230 mm. to 760 mm. Hg. of steam, said tempering being carried out for about one hour to about four hours. The pH of the final product is then adjusted to 4.0–4.6 by adding an alkaline compound, preferably a sodium phosphate such as trisodium phosphate or tetrasodium pyrophosphate. Other alkaline compounds which have been employed are calcium carbonate, calcium hydroxide, and tricalcium phosphate.

The starting material, namely, the monosodium orthophosphate as a slurry or solution can be prepared by dissolving therein various sodium phosphates, phosphoric acids, and sodium carbonates or hydroxide which may be mixed to provide a slurry or solution corresponding stoichiometrically to the formation of monosodium phosphate with an excess of phosphoric acid. For example, $Na_2HPO_4.2H_2O$ may be mixed together with $H_3PO_4$ preferably in 75% concentration to obtain $NaH_2PO_4$ containing excess phosphoric acid. The proportion of excess phosphoric acid may vary from 0.50 to 0.65% by weight, basis $NaH_2PO_4$. A preferred range is from 0.54 to 0.60%, while 0.58% is a still more preferred amount of free acid. Such acidity may also be expressed by reference to the pH thereof. Thus the present invention contemplates the use of solutions or slurries having pH values in the range of from 4.02 to 4.12 and preferably 4.05 to 4.08. This is in contrast to the pH of 4.6 for pure monosodium phosphate. When a solution is referred to herein the term also includes slurries.

The above solution or slurry is then thermally evaporated to obtain monosodium phosphate containing excess, free phosphoric acid, such as by means of a drum dryer to obtain an anhydrous product. The next step in the process is the calcination of the so-formed compounds by conventional methods in order to transform the same to the pyrophosphate form. It is possible to do this in the absence of steam, or in an atmosphere containing a partial pressure of water corresponding to 100 mm. to 140 mm. Hg. Thereafter the sodium acid pyrophosphate is tempered so as to stabilize the same. The tempering of the sodium acid pyrophosphate is carried out by passing the mixture into a rotating drum wherein the temperature is maintained at 215° C. to 245° C. The partial water vapor content is maintained at 230 mm. to 760 mm. Hg a preferred range being from 305 to 380 mm. Hg of steam in the tempering unit. The tempering operation is carried out for about one hour to about four hours at atmospheric pressure. It is obvious however that the use of a higher humidity enables the process to be carried out at the shorter time periods within the above ranges. In general, the higher the proportion of water vapor present in the tempering step, the shorter is the time required to yield a product having a given reaction rate within the limits of about 30 to 40 and vice versa.

It has been found that this process step of tempering to control the water relationship in the molecular structure of the final compound is essential in order to provide the said product of optimum dough reaction rate for the production of doughnuts.

After the tempering step, the pyrophosphate product containing excess phosphoric acid is adjusted in pH by the addition of a basic sodium phosphate, such as tetrasodium pyrophosphate in order to raise the value of the pH to approximately 4.2 corresponding to sodium acid pyrophosphate. However, it has been found that desirable products are obtained having particular utility as the acid leavening agent in the production of doughnuts if the final pH is in the range of 4.0 to 4.6.

The product is milled to a fineness permitting at least 75% by weight of the material to pass through a 325 mesh screen. More particularly the product is ground to meet the following specifications:

*Screen size (U. S. standard sieves)*

| | |
|---|---|
| CR 80 | 0–0.1 |
| CR 100 | 0–0.5 |
| CR 325 | 10–25.0 |

The invention will be further illustrated by the following specific examples. However, it should be understood that these examples are given primarily for purposes of illustration and the invention in its broader aspects is not limited thereto.

EXAMPLE 1

A solution containing 148.5 pounds of monosodium phosphate in 100 pounds of water was prepared. To this solution was added 0.24 pound $NaAlO_2$, 0.25 pound KOH and about 0.5 pound $H_3PO_4$ (as 75% acid) to reduce the pH value to 4.05. The solution was thermally evaporated to dryness on a drum dryer to give the anhydrous form of monosodium orthophosphate containing minor proportions of acid and added components as described above. The dry salts were then calcined in a cylindrical vessel at a temperature of about 225° C. to about 235° C., which operation produced sodium acid pyrophosphate. In order to temper this crude material to provide a satisfactory product for use in doughnut baking the above sodium acid pyrophosphate was tempered at 225–235° C. in a rotating cylindrical drum having an open end for the feed and having a discharge spout at the other end arranged with a slight inclination of the longitudinal axis of the drum so that rotation of the said drum caused the product to pass progressively down the length of the drum. Provision was also made for the introduction of steam so as to provide a partial water vapor pressure of about 350 mm. of mercury in the atmosphere of the drum.

The charge of calcined sodium acid pyrophosphate was fed to the above apparatus at a rate such that the sojourn time of the material being tempered in the above unit was about two hours.

After tempering, the product was treated with about 2.4 pounds of tetrasodium pyrophosphate to adjust the pH to 4.4, whereupon it was discharged from the apparatus and milled to the desired particle size. The dough reaction rate for the product produced in the above manner was 36.6. The baking score of the doughnuts prepared from this dough mix was 81.4.

EXAMPLE 2

The above procedure was repeated using a partial pressure of steam in the tempering unit of about 305 mm. Hg and a sojourn time of about two hours. The dough reaction rate for this product was 35.3. The products of Examples 1 and 2 were evaluated from the standpoint of the doughnut leavening properties. These products were found to be markedly superior to conventional stabilized sodium acid pyrophosphate. For example, when a typical sample of stabilized sodium acid pyrophosphate according to U. S. Patent 2,408,258, and the products of Examples 1 and 2 were used with commercially prepared doughnut mixes in the baking of doughnuts the following results were obtained:

| Sodium Acid Pyrophosphate | Dough Reaction Rate | Baking Score |
|---|---|---|
| Sample according to U. S. 2,408,248 | 25.8 | 56.7 |
| Sample of Example 1 | 36.6 | 81.4 |
| Sample of Example 2 | 35.3 | 78.0 |

A doughnut having a total score of at least 60 is deemed satisfactory. Therefore, it is evident from the above data that the employment of the critical pH in crystallizing, calcining and tempering the present material, together with the use of a specific humidity in the tempering step as described above produces sodium acid pyrophosphate which is eminently suitable for use in baking doughnuts.

In arriving at the above baking scores, the appearance of the up side and down side of the doughnuts is taken into consideration. The former is considered the more important of the two and is given a total rating of 65, whereas the latter is assigned a total rating of 35. The above total ratings are broken down as follows:

*Up side of doughnut*

| | |
|---|---|
| Dishing | 30 |
| Breaks | 10 |
| Color | 5 |
| Surface texture | 20 |
| Total | 65 |

*Down side of doughnut*

| | |
|---|---|
| Flutes | 20 |
| Breaks | 10 |
| Blisters | 5 |
| Total | 35 |

The above method, although qualitative in nature, constitutes a very convenient and practical means of evaluating the effectiveness of a given leavening acid in the baking of doughnuts and the results obtained by those skilled in the art in applying this test agree quite closely.

The products of the instant invention are admirably suitable for use in the baking of doughnuts, giving a baking score of 60 to 90. Moreover, they are characterized by excellent stability to change in reaction rate. For example, they do not vary in this respect more than 5% and usually not more than 3% when subjected to 75% relative humidity and a temperature of 30° C. for a period of eight days. This is important, since in practice the above products are not used immediately after they are prepared.

The dough reaction rate as used in the present specification is the amount of carbon dioxide evolved from moist dough leavened with sodium acid pyrophosphate during the first eight minutes at a temperature of 27° C. For example, if the above compound in a leavening composition containing sodium bicarbonate liberates at 27° C. about 35% of the contained carbon dioxide over a period of eight minutes it exhibits a reaction rate of 35. For a more detailed discussion of dough reaction rate reference is made to "Cereal Chemistry" vol. 8, page 423 of 1931.

As pointed out earlier herein, the stabilized sodium acid pyrophosphate disclosed and claimed in Patent No. 2,408,258, to Eugene N. Hetzel et al. is employed as the reference material in the testing of the results obtained from the present invention. Accordingly, the initial reaction rate of the product described in the Hetzel et al. patent varies within the range of about 25 to 30 depending upon its content of alkali metal oxide and $Al_2O_3$ impurities. Therefore, the hereinbefore described operating conditions will vary to some extent with the desired reaction rate of the product obtained as a stabilized sodium acid pyrophosphate.

While the invention has been described in a detailed manner with illustrated suitable modes of effecting same, it is to be understood that modifications may be made and that no limitations other than those imposed by the scope of the appended claims are intended.

What is claimed is:

1. The method of preparing sodium acid pyrophosphate having substantially improved doughnut baking properties which comprises thermally evaporating a monosodium orthophosphate solution containing from 0.50% to 0.65% by weight of phosphoric acid together with about 0.10% to about 0.20% $K_2O$ and about 0.025% to about 0.075% $Al_2O_3$, basis $NaH_2PO_4$, to produce substantially dry monosodium orthophosphate, calcining the said monosodium orthophosphate at a temperature of about 225° C. to about 235° C. until sodium acid pyrophosphate has been formed, and thereafter tempering the said pyrophosphate by maintaining it at atmospheric pressure and at a temperature of about 215° C. to about 245° C. in an atmosphere containing 230 mm. to 760 mm. Hg of steam, said tempering being carried out for about one hour to about four hours, and thereafter adding to the said pyrophosphate a basic sodium phosphate to obtain a product having a pH value of from 4.0 to 4.6.

2. The method of preparing sodium acid pyrophosphate having substantially improved doughnut baking properties which comprises thermally evaporating a monosodium orthophosphate solution containing from 0.54% to 0.60% by weight of phosphoric acid together with about 0.10% to about 0.20% $K_2O$ and about 0.025% to about 0.075% $Al_2O_3$, basis $NaH_2PO_4$, to produce substantially dry monosodium orthophosphate, calcining the said monosodium orthophosphate at a temperature of about 225° C. to about 235° C. until sodium acid pyrophosphate has been formed, and thereafter tempering the said pyrophosphate by maintaining it at atmospheric pressure and at a temperature of about 215° C. to about 245° C. in an atmosphere containing 230 mm. to 760 mm. Hg of steam, said tempering being carried out for about one hour to about four hours, and adding to the said pyrophosphate sufficient tetrasodium pyrophosphate to obtain a product having a pH of about 4.2.

3. Sodium acid pyrophosphate of substantially improved doughnut baking properties produced by the method defined in claim 1.

4. Sodium acid pyrophosphate of substantially improved doughnut baking properties produced by the method defined in claim 2.

FELIX H. WRIGHT, Jr.

REFERENCES CITED

The following references are of record in the file of this patent:

UNITED STATES PATENTS

| Number | Name | Date |
|---|---|---|
| 2,138,029 | Fiske | Nov. 29, 1938 |
| 2,366,857 | Hurka | Jan. 9, 1945 |
| 2,408,258 | Hetzel | Sept. 24, 1946 |
| 2,532,281 | Barch | Dec. 5, 1950 |